(12) United States Patent
Cho et al.

(10) Patent No.: US 8,886,184 B2
(45) Date of Patent: Nov. 11, 2014

(54) METHOD OF PERFORMING CELL RESELECTION PROCEDURE IN WIRELESS COMMUNICATION SYSTEM

(75) Inventors: Hang Gyu Cho, Anyang-si (KR); Hyung Ho Park, Anyang-si (KR); Doo Hyun Sung, Anyang-si (KR); Jin Soo Choi, Anyang-si (KR); Jae Hoon Chung, Anyang-si (KR); Jong Young Han, Anyang-si (KR); Kyu Jin Park, Anyang-si (KR); Eun Jong Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 83 days.

(21) Appl. No.: 12/675,308

(22) PCT Filed: Sep. 18, 2008

(86) PCT No.: PCT/KR2008/005524
§ 371 (c)(1),
(2), (4) Date: Feb. 25, 2010

(87) PCT Pub. No.: WO2009/038368
PCT Pub. Date: Mar. 26, 2009

(65) Prior Publication Data
US 2010/0222055 A1    Sep. 2, 2010

Related U.S. Application Data

(60) Provisional application No. 60/973,177, filed on Sep. 18, 2007.

(30) Foreign Application Priority Data

Jul. 29, 2008  (KR) .................. 10-2008-0074119

(51) Int. Cl.
*H04W 4/00* (2009.01)
*H04M 1/66* (2006.01)
*H04W 36/00* (2009.01)
*H04B 7/00* (2006.01)
*H04L 12/28* (2006.01)
*H04J 1/00* (2006.01)
*H04W 36/14* (2009.01)
*H04W 36/24* (2009.01)

(52) U.S. Cl.
CPC ......... *H04W 36/0083* (2013.01); *H04J 11/086* (2013.01); *H04W 36/14* (2013.01); *H04W 36/24* (2013.01)
USPC ........... 455/434; 455/411; 455/437; 455/525; 455/436; 370/431; 370/328; 370/343; 370/436; 370/437

(58) Field of Classification Search
USPC ....................................................... 455/434
See application file for complete search history.

(56) References Cited

U.S. PATENT DOCUMENTS 7,016,680 B2   3/2006   Yagi
7,486,699 B2   2/2009   Yi et al.
(Continued)

FOREIGN PATENT DOCUMENTS

CN   1505416 A   6/2004
CN   1567769 A   1/2005
(Continued)

OTHER PUBLICATIONS

Ghosh et al., "Random Access Design for UMTS Air-Interface Evolution", IEEE, pp. 1041-1045, 2007.
(Continued)

*Primary Examiner* — Timothy Pham
(74) *Attorney, Agent, or Firm* — Mckenna Long & Aldridge LLP (57) ABSTRACT

A method of performing a cell reselection procedure in a wireless communication system includes evaluating priorities of a serving cell and neighbor cells, each of which use different frequency bands, performing inter-frequency measurement on a neighbor cell which has a higher priority than the serving cell, performing the inter-frequency measurement on a neighbor cell which has an equal or lower priority than the serving cell, when a signal characteristic of the serving cell is less than a threshold, and performing cell reselection according to the priorities.

8 Claims, 7 Drawing Sheets

(56) References Cited

U.S. PATENT DOCUMENTS

| | | | |
|---|---|---|---|
| 7,904,055 B2 | 3/2011 | Lee et al. | |
| 7,916,689 B2 | 3/2011 | Jeong et al. | |
| 2003/0040311 A1* | 2/2003 | Choi | 455/434 |
| 2003/0054820 A1 | 3/2003 | Kang et al. | |
| 2004/0162074 A1* | 8/2004 | Chen | 455/437 |
| 2005/0037798 A1* | 2/2005 | Yamashita et al. | 455/525 |
| 2005/0047416 A1 | 3/2005 | Heo et al. | |
| 2005/0090278 A1 | 4/2005 | Jeong et al. | |
| 2005/0153700 A1 | 7/2005 | Farnsworth et al. | |
| 2005/0169293 A1 | 8/2005 | Zhang et al. | |
| 2005/0213605 A1 | 9/2005 | Kim et al. | |
| 2007/0004445 A1* | 1/2007 | Dorsey et al. | 455/525 |
| 2007/0053383 A1 | 3/2007 | Choi et al. | |
| 2007/0098053 A1 | 5/2007 | Rinne et al. | |
| 2007/0116094 A1 | 5/2007 | Parts et al. | |
| 2007/0123265 A1 | 5/2007 | Moon | |
| 2007/0223510 A1* | 9/2007 | Joo | 370/436 |
| 2008/0043771 A1 | 2/2008 | Cho et al. | |
| 2008/0049708 A1 | 2/2008 | Khan et al. | |
| 2008/0176565 A1* | 7/2008 | Eerolainen et al. | 455/436 |
| 2008/0220784 A1* | 9/2008 | Somasundaram et al. | 455/437 |
| 2008/0268843 A1 | 10/2008 | Ore et al. | |
| 2008/0313300 A1 | 12/2008 | Alanara et al. | |
| 2009/0088160 A1* | 4/2009 | Pani et al. | 455/436 |
| 2010/0081438 A1* | 4/2010 | Callender et al. | 455/436 |
| 2010/0183031 A1 | 7/2010 | Dalsgaard et al. | |
| 2010/0195522 A1 | 8/2010 | Lee et al. | |
| 2010/0195579 A1 | 8/2010 | Park et al. | |
| 2010/0297991 A1 | 11/2010 | Dahlman et al. | |

FOREIGN PATENT DOCUMENTS

| | | |
|---|---|---|
| CN | 1725869 A | 1/2006 |
| CN | 1835627 | 9/2006 |
| CN | 1954521 | 4/2007 |
| EP | 1286564 | 2/2003 |
| EP | 2119254 | 11/2009 |
| EP | 2512186 | 10/2012 |
| KR | 10-2001-0045783 | 6/2001 |
| KR | 10-2007-0023203 | 2/2007 |
| KR | 10-2007-0023203 A | 2/2007 |
| WO | 2004040935 | 5/2004 |
| WO | WO 2006/052086 | 5/2006 |
| WO | 2007052888 A2 | 5/2007 |
| WO | WO 2007/052888 A2 | 5/2007 |
| WO | WO 2007/052916 A1 | 5/2007 |
| WO | 2007/077096 A2 | 7/2007 |

OTHER PUBLICATIONS

3GPP TS 36.300V8.1.0,; $3^{rd}$ Generation Partnership Project; Technical Specification Group Radio Access Network: Evolved Universal Terrestrial Radio Access (E-UTRAN) Stage 2, Jul. 3, 2007.

Nokia Siemens Networks et al.: "E-UTRA Measurements and Cell Reselection Considerations", 3GPP TSG-RAN WG2 Meeting #58bis, Orlando, Florida, Jun. 25-29, 2007, R2-072386 and R2-071727.

Nokia Siemens Networks et al.: "E-UTRA Cell Selection and Cell Reselection Aspects", 3GPP TSG-RAN WG4 Meeting #43bis, Orlando, Florida, Jun. 25-29, 2007, R4-071118.

3GPP TSG-RAN WG2 #58, May 7-11, Kobe, Japan 2007, Agenda Item: 4.02, Source: Ericsson, Title: Summary of E-mail discussion on cell reselection parameters in LTE, Document for: Discussion and Decision, pp. 1-4, R2-071808.

$3^{rd}$ Generation Partnership Project; Technical Specification Group Radio Access network; User Equipment (UE) procedures in idle mode and procedures for fell reselection in connected mode (Release 7), 3GPP TS 25.304 V7.2.0, Jun. 2007.

Radio Access Network Technology in 3GPP Evolution (Elementary Technologies of the Evolved RAN Based on 3GPP LTE Standards), IT R&D Global Leader, Jun. 29, 2007, Electronics and Telecommunications Research Institute.

"Radio Access Network Technology in 3GPP Evolution," KRnet 2007 (Jun. 29, 2007).

3GPP TR 25.813 V7.1.0; 3GP.3rd Generation Partnership Project; Technical Specification Group Radio Access Network; Evolved Universal Terrestrial Radio Access (E-UTRA) and Evolved Universal Terrestrial Radio Access Network (E-UTRAN0; Radio Interface Protocal Aspects (Release 7).

$3^{rd}$ Generation Partnership Project, "Technical Specification Group Radio Access Network; Evolved Universal Terrestrial Radio Access (E-UTRA) and Evolved Universal Terrestrial Radio Access Network (E-UTRAN); Radio interface profocol aspects (Release 7)", 3GPP TR 25.813 v7.1.0, Sep. 2006.

Motorola, "Random Access Procedure and Message Contents", 3GPP TSG-RAN WG2 AH, Jun. 27-30, 2006, Cannes, France, R2-061991.

Samsung, "Contention resolution", 3GPP TSG RAN2 #54, Tallinn, Estonia, IMSI, R2-062260, Sep. 2, 2006.

3GPP TS 36.300 V8.1.0; 3GP.3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8), Jun. 2007.

* cited by examiner

//www.w3.org/1999/xhtml">
METHOD OF PERFORMING CELL RESELECTION PROCEDURE IN WIRELESS COMMUNICATION SYSTEM This application is a national phase application based on International Application No. PCT/KR2008/005524, filed on Sep. 18, 2008, which claims priority to U.S. Provisional Application No. 60/973,177, filed Sep. 18, 2007 and Korean Patent Application No. 10-2008-0074119, filed Jul. 29, 2008, all of which are incorporated by reference for all purposes as if fully set forth herein.

TECHNICAL FIELD

The present invention relates to wireless communications, and more particularly, to a method of performing a cell reselection procedure in a wireless communication system.

BACKGROUND ART

Third generation partnership project (3GPP) mobile communication systems based on a wideband code division multiple access (WCDMA) radio access technology are widely spread all over the world. High-speed downlink packet access (HSDPA) that can be defined as a first evolutionary stage of WCDMA provides 3GPP with a radio access technique that is highly competitive in the mid-term future. However, since requirements and expectations of users and service providers are continuously increased and developments of competing radio access techniques are continuously in progress, new technical evolutions in 3GPP are required to secure competitiveness in the future. Reduction of cost per bit, increase of service availability, flexible use of frequency bands, simple structure and open interface, proper power consumption of a user equipment (UE), and the like are defined as requirements.

A cell selection procedure is a procedure for selecting a cell in which a service is provided to the UE. In general, the UE selects a cell having a strongest signal characteristic value by performing a signal measurement procedure with a base station (BS) in all searchable frequency bands. When the UE moves far from a serving cell currently providing a service to the UE, the UE reselects a desired cell capable of receiving a signal with a better characteristic. This is called a cell reselection procedure. The cell reselection procedure is to select a more desired cell according to a criterion for signal measurement and for cell reselection in an idle state. The UE may request a network to provide a service or may wait in the idle state to receive the service from the network. When in the idle state, the UE repeats the cell reselection procedure in which a cell having a better signal characteristic is reselected by measuring signals of the serving cell and its neighbor cells.

If the cell reselection procedure is performed using only signal measurement of the UE, a system load (e.g., a camp load or a traffic load) may be generated when a large number of UEs are located in one cell. In this case, the BS cannot properly distribute the system load. The cell reselection procedure is important to provide a better quality of service to a UE having mobility.

Accordingly, there is a need for a method of effectively performing a cell reselection procedure of a UE.

DISCLOSURE OF INVENTION

Technical Problem

The present invention provides a method of performing a cell reselection procedure.

Technical Solution

In an aspect, a method of performing a cell reselection procedure in a wireless communication system includes evaluating priorities of a serving cell and neighbor cells, each of which use different frequency bands, performing inter-frequency measurement on a neighbor cell which has a higher priority than the serving cell, performing the inter-frequency measurement on a neighbor cell which has an equal or lower priority than the serving cell, when a signal characteristic of the serving cell is less than a threshold, and performing cell reselection according to the priorities.

In another aspect, a method of performing a cell reselection procedure in a wireless communication system includes measuring signal characteristics of a serving cell and its neighbor cells, and reselecting one cell selected from the neighbor cells, wherein the serving cell and the neighbor cell use different frequency bands, and the signal characteristic of the neighbor cell is measured when the neighbor cell has a higher priority than the serving cell or when the signal characteristic of the serving cell is less than a threshold.

Advantageous Effects

According to the present invention, in a cell reselection procedure of a user equipment, an unnecessary cell search operation can be avoided according to priority. In addition, a cell reselection indicator can be used to reduce a system load and power consumption of the user equipment by controlling a cell reselection criterion. Therefore, the cell reselection procedure can be effectively performed.

MODE FOR THE INVENTION

Figure 1:
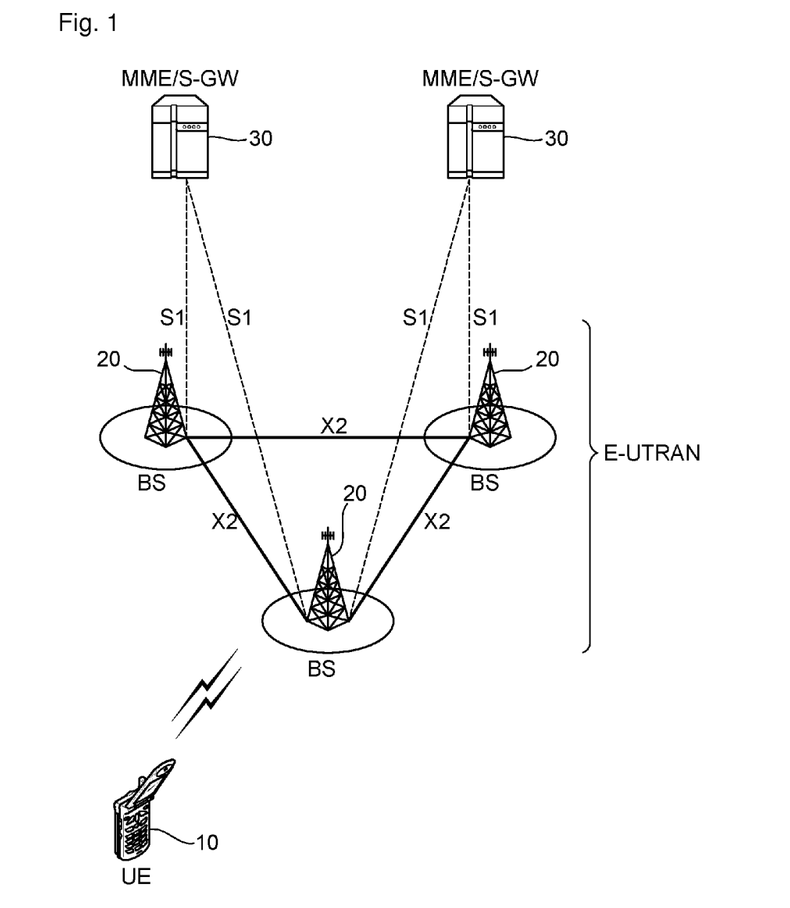
FIG. 1 shows a structure of a wireless communication system.

FIG. 1 shows a structure of a wireless communication system. The wireless communication system may have a network structure of an evolved-universal mobile telecommunications system (E-UMTS). The E-UMTS may be referred to as a long-term evolution (LTE) system. The wireless communication system can be widely deployed to provide a variety of communication services, such as voices, packet data, etc.

Referring to FIG. 1, an evolved-UMTS terrestrial radio access network (E-UTRAN) includes at least one base station (BS) 20 which provides a control plane and a user plane.

A user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. Interfaces for transmitting user traffic or control traffic may be used between the BSs 20. Hereinafter, a downlink is defined as a communication link from the BS 20 to the UE 10, and an uplink is defined as a communication link from the UE 10 to the BS 20.

The BSs 20 are interconnected by means of an X2 interface. The BSs 20 are also connected by means of an S1 interface to an evolved packet core (EPC), more specifically, to a mobility management entity (MME)/serving gateway (S-GW) 30. The S1 interface supports a many-to-many relation between the BS 20 and the MME/S-GW 30.

Figure 2:
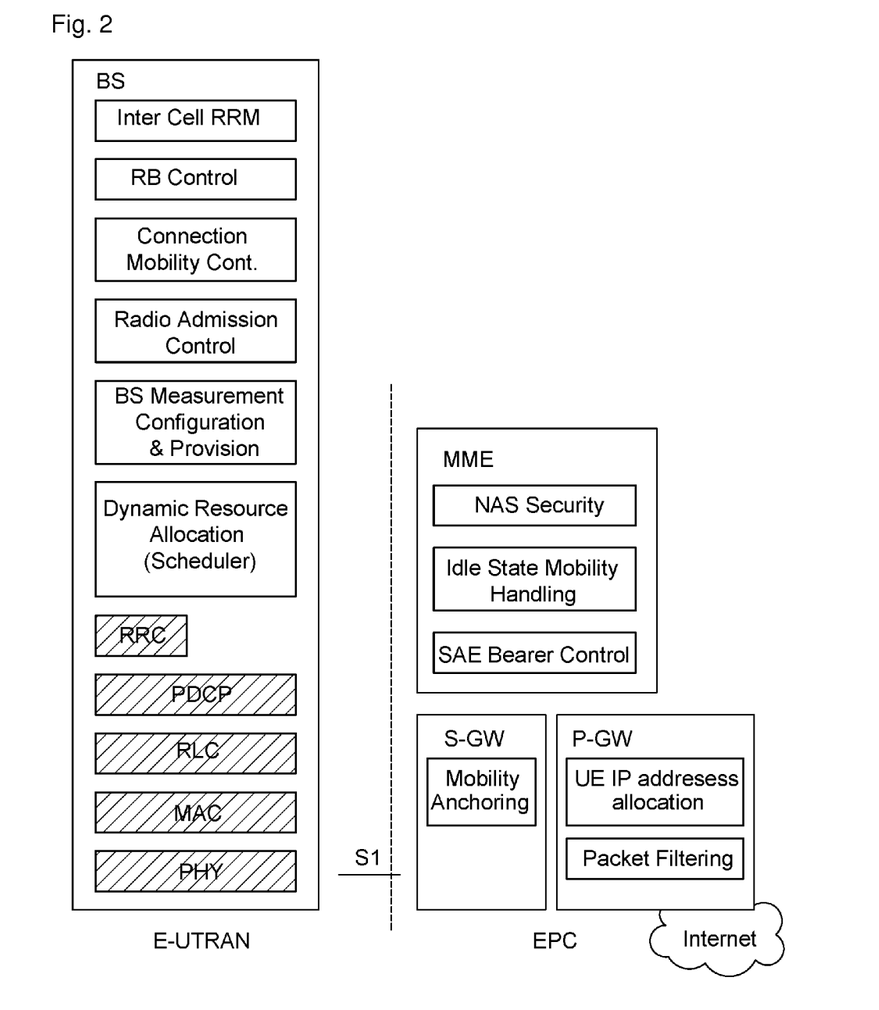
FIG. 2 is a block diagram showing functional split between an evolved universal terrestrial radio access network (E-UTRAN) and an evolved packet core (EPC).

FIG. 2 is a block diagram showing functional split between the E-UTRAN and the EPC. Slashed boxes depict radio protocol layers and white boxes depict the functional entities of the control plane.

Referring to FIG. 2, the BS performs the following functions: (1) functions for radio resource management (RRM) such as radio bearer control, radio admission control, connection mobility control, and dynamic allocation of resources to the UE; (2) Internet protocol (IP) header compression and encryption of user data streams; (3) routing of user plane data to the S-GW; (4) scheduling and transmission of paging messages; (5) scheduling and transmission of broadcast information; and (6) measurement and measurement reporting configuration for mobility and scheduling.

The MME performs the following functions: (1) non-access stratum (NAS) signaling; (2) NAS signaling security; (3) idle mode UE reachability; (4) tracking area list management; (5) roaming; and (6) authentication.

The S-GW performs the following functions: (1) mobility anchoring; and (2) lawful interception. The PDN gateway (P-GW) performs the following functions: (1) UE IP allocation; and (2) packet filtering.

Figure 3:
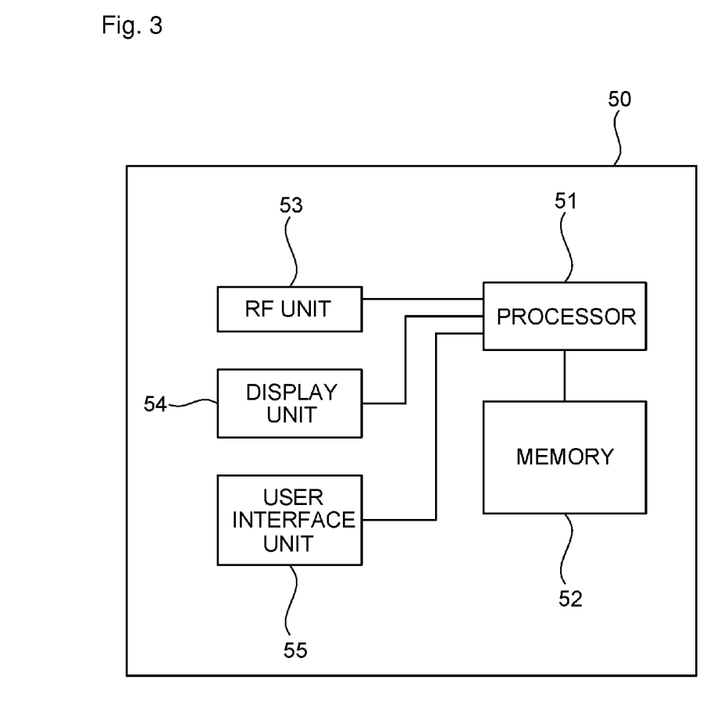
FIG. 3 is a block diagram showing constitutional elements of a user equipment (UE).

FIG. 3 is a block diagram showing constitutional elements of the UE. A UE 50 includes a processor 51, memory 52, a radio frequency (RF) unit 53, a display unit 54 and a user interface unit 55. Layers of the radio interface protocol are implemented in the processor 51. The processor 51 provides the control plane and the user plane. The function of each layer can be implemented in the processor 51. The processor 51 obtains system information to be described below.

The memory 52 is coupled to the processor 51 and stores an operating system, applications, and general files. The display unit 54 displays a variety of information of the UE 50 and may use a well-known element such as a liquid crystal display (LCD), an organic light emitting diode (OLED), etc. The user interface unit 55 can be configured with a combination of well-known user interfaces such as a keypad, a touch screen, etc. The RF unit 53 is coupled to the processor 51 and transmits and/or receives radio signals.

Layers of a radio interface protocol between the UE and the network can be classified into L1 layer (a first layer), L2 layer (a second layer), and L3 layer (a third layer) based on the lower three layers of the open system interconnection (OSI) model that is well-known in the communication system. A physical layer, or simply a PHY layer, belongs to the first layer and provides an information transfer service through a physical channel. A radio resource control (RRC) layer belongs to the third layer and serves to control radio resources between the UE and the network. The UE and the network exchange RRC messages via the RRC layer.

Figure 4:
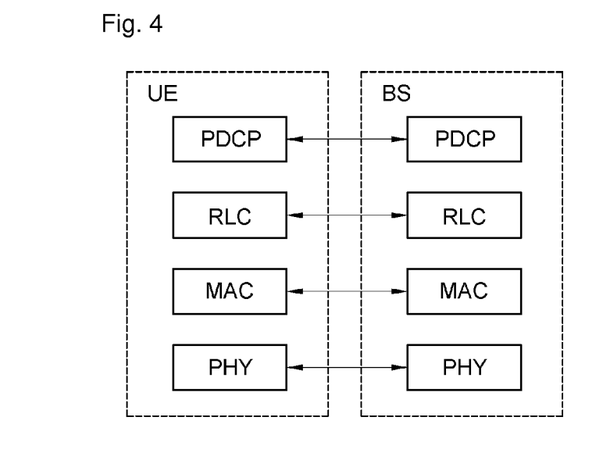
FIG. 4 is a diagram showing a radio protocol architecture for a user plane.
Figure 5:
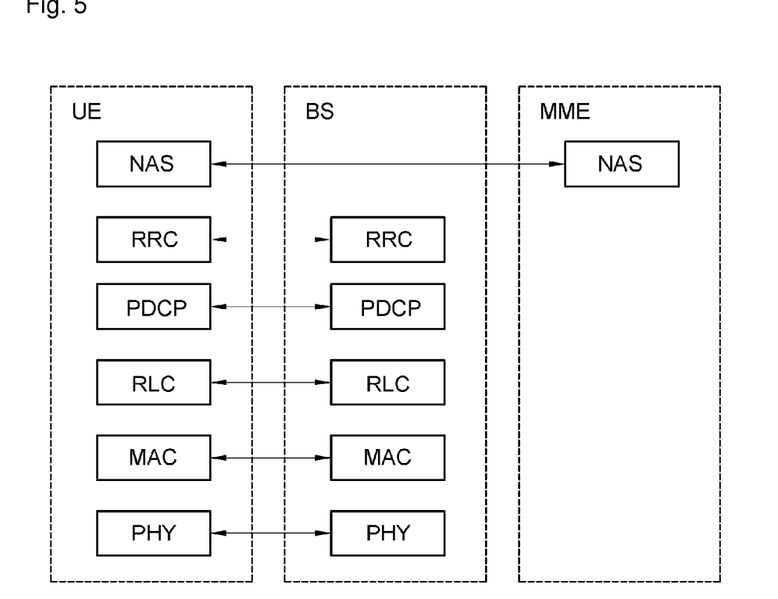
FIG. 5 is a diagram showing a radio protocol architecture for a control plane.

FIG. 4 is a diagram showing a radio protocol architecture for the user plane. FIG. 5 is a diagram showing a radio protocol architecture for the control plane. They illustrate an architecture of a radio interface protocol between the UE and the E-UTRAN. The user plane is a protocol stack for user data transmission. The control plane is a protocol stack for control signal transmission.

Referring to FIGS. 4 and 5, a PHY layer belongs to the first layer and provides an upper layer with an information transfer service through a physical channel. The PHY layer is coupled with a medium access control (MAC) layer, i.e., an upper layer of the PHY layer, through a transport channel. Data is transferred between the MAC layer and the PHY layer through the transport channel. Between different PHY layers (i.e., a PHY layer of a transmitter and a PHY layer of a receiver), data are transferred through the physical channel.

The MAC layer belongs to the second layer and provides services to a radio link control (RLC) layer, i.e., an upper layer of the MAC layer, through a logical channel. The RLC layer in the second layer supports reliable data transfer. There are three operating modes in the RLC layer, that is, a transparent mode (TM), an unacknowledged mode (UM), and an acknowledged mode (AM) according to a data transfer method. An AM RLC provides bidirectional data transmission services and supports retransmission when the transfer of the RLC PDU fails.

A packet data convergence protocol (PDCP) layer belongs to the second layer and performs a header compression function for reducing an IP packet header size.

A radio resource control (RRC) layer belongs to the third layer and is defined only in the control plane. The RRC layer serves to control the logical channel, the transport channel, and the physical channel in association with configuration, reconfiguration and release of radio bearers (RBs). An RB is a service provided by the second layer for data transmission between the UE and the E-UTRAN. When an RRC connection is established between an RRC layer of the UE and an RRC layer of the network, it is called that the UE is in an RRC connected mode. When the RRC connection is not established yet, it is called that the UE is in an RRC idle mode.

A non-access stratum (NAS) layer belongs to an upper layer of the RRC layer and serves to perform session management, mobility management, or the like.

Figure 6:
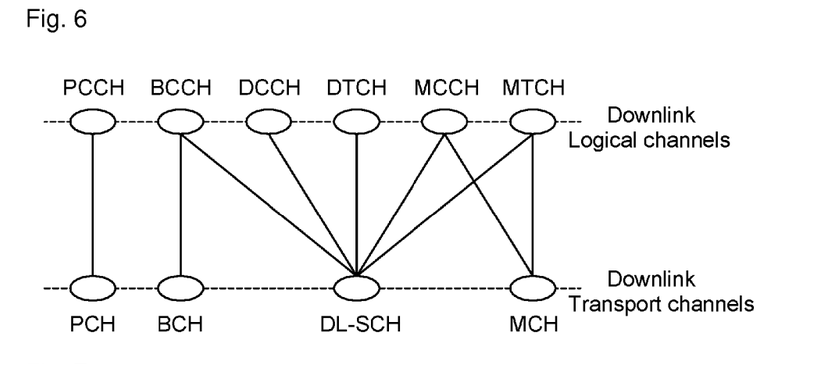
FIG. 6 shows mapping between downlink logical channels and downlink transport channels.
Figure 7:
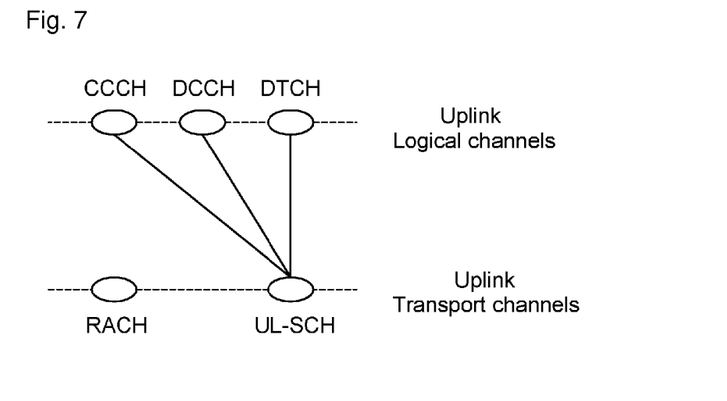
FIG. 7 shows mapping between uplink transport channels and uplink physical channels.

FIG. 6 shows mapping between downlink logical channels and downlink transport channels. FIG. 7 shows mapping between uplink transport channels and uplink physical channels. This is disclosed in the section 6.1.3.2 of 3GPP TS 36.300 V8.3.0 (2007-12) Technical Specification Group Radio Access Network; Evolved Universal Terrestrial Radio Access (E-UTRA) and Evolved Universal Terrestrial Radio Access Network (E-UTRAN); Overall description; Stage 2 (Release 8).

Referring to FIGS. 6 and 7, in downlink, a paging control channel (PCCH) is mapped to a paging channel (PCH). In addition, a broadcast control channel (BCCH) is mapped to a broadcast channel (BCH) or a downlink shared channel (DL-SCH). A common control channel (CCCH), a dedicated control channel (DCCH), a dedicated traffic channel (DTCH), a multicast control channel (MCCH), and a multicast traffic channel (MTCH) are mapped to the DL-SCH. The MCCH and MTCH are also mapped to a multicast channel (MCH). In uplink, the CCCH, the DCCH, and the DTCH are mapped to an uplink shared channel (UL-SCH).

A type of each logical channel is defined according to a type of information to be transmitted. A logical channel is classified into two groups, i.e., a control channel and a traffic channel.

The control channel is used for transfer of control plane information. The BCCH is a downlink control channel for broadcasting system control information. The PCCH is a downlink channel that transfers paging information and is used when a network does not know the location of a UE. The CCCH is a channel for transmitting control information between the UE and the network and is used when there is no RRC connection established between the UE and the network. The MCCH is a point-to-multipoint downlink channel used for transmitting multimedia broadcast multicast service (MBMS) control information from the network to the UE. The MCCH is used by UEs that receive an MBMS. The DCCH is a point-to-point bi-directional channel that transmits dedicated control information between the UE and the network, and is used by UEs having an RRC connection.

The traffic channel is used for the transfer of user plane information. The DTCH is a point-to-point channel dedicated to one UE, for the transfer of user information. The DTCH can exist in both uplink and downlink. The MTCH is a point-to-multipoint downlink channel for transmitting traffic data from the network to the UE and is used by the UEs that receive the MBMS.

The transport channel is classified according to a type and characteristic of data transmission through a radio interface. The BCH is broadcast in the entire coverage area of the cell and has fixed, pre-defined transport format. The DL-SCH is characterized by support for hybrid automatic repeat request (HARM), support for dynamic link adaptation by varying the modulation, coding, and transmit (Tx) power, possibility to be broadcast in the entire cell, possibility to use beamforming, support for both dynamic and semi-static resource allocation, support for UE discontinuous reception (DRX) to enable UE power saving, and support for MBMS transmission. The PCH is characterized by support for UE DRX to enable UE power saving and requirement to be broadcast in the entire coverage area of the cell. The MCH is characterized by support for requirement to be broadcast in the entire coverage area of the cell and support for an MBMS single frequency network (MBSFN).

A UL-SCH and a random access channel (RACH) are uplink transport channels. The UL-SCH is characterized by support for dynamic link adaptation for changing Tx power and modulation and coding and support for HARQ and dynamic/semi-static resource allocation. The RACH is characterized by limited control information and collision risk.

Figure 8:
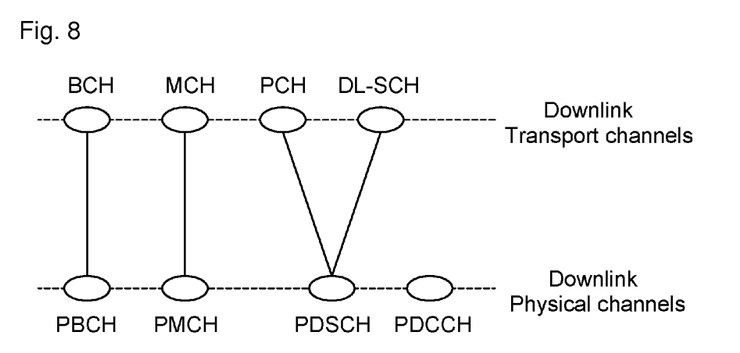
FIG. 8 shows mapping between downlink transport channels and downlink physical channels.
Figure 9:
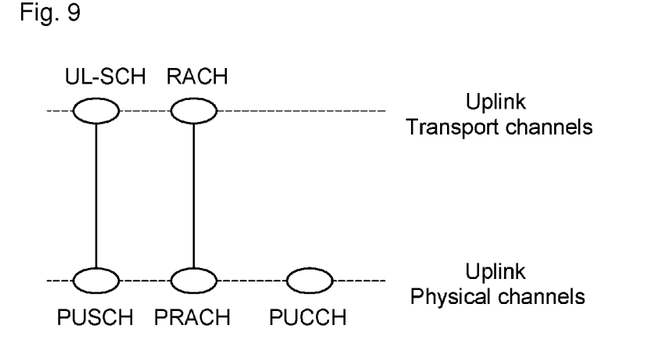
FIG. 9 shows mapping between uplink transport channels and uplink physical channels.

FIG. 8 shows mapping between downlink transport channels and downlink physical channels. FIG. 9 shows mapping between uplink transport channels and uplink physical channels.

Referring to FIGS. 8 and 9, in downlink, a BCH is mapped to a physical broadcast channel (PBCH). In addition, a MCH is mapped to a physical multicast channel (PMCH). In addition, a PCH and a DL-SCH are mapped to a physical downlink shared channel (PDSCH). The PBCH carries a BCH transport block. The PMCH carries the MCH. The PDSCH carries the DL-SCH and the PCH. In uplink, a UL-SCH is mapped to a physical uplink shared channel (PUSCH). In addition, an RACH is mapped to a physical random access channel (PRACH). The PRACH carries a random access preamble.

There are several physical control channels used in a PHY layer. A physical downlink control channel (PDCCH) informs a UE of resource allocation of the PCH and DL-SCH, and HARQ information related to the DL-SCH. The PDCCH may carry an uplink scheduling grant which informs the UE of resource allocation for uplink transmission. A physical control format indicator channel (PCFICH) informs the UE of the number of orthogonal frequency division multiplexing (OFDM) symbols used for the PDCCHs and is transmitted in every subframe. A physical hybrid ARQ indicator channel (PHICH) carries HARQ acknowledgement (ACK)/negative-acknowledgement (NACK) signals in response to uplink transmission. A physical uplink control channel (PUCCH) carries HARQ ACK/NACK signals in response to downlink transmission, scheduling request, and uplink control information (e.g., a channel quality indicator (CQI)).

A BS informs the UE of a plurality of pieces of basic information for network access by using system information. The system information includes necessary information which needs to be known to the UE so as to access to the BS. Therefore, the UE has to entirely receive the system information before accessing to the BS and always has to maintain the latest system information. Since the system information has to be known to all UEs within one cell, the BS periodically transmits the system information.

Now, a cell selection and reselection procedure performed by a UE in an idle mode will be described. Hereinafter, a physical signal characteristic in association with a signal strength or a signal-to-interference plus noise ratio (SINR) will be simply referred to as a signal characteristic.

Cell selection is performed so that the UE is registered to a network. Thus, the UE can receive a service from a BS. Herein, if the strength or quality of a signal between the UE and the BS deteriorates due to mobility of the UE, the UE reselects another cell for the purpose of maintaining the quality of data transmission.

The cell selection may be carried out according to a signal characteristic depending on a wireless environment. Criteria used in the cell selection performed by the UE may be as follows: (1) UE capability; (2) subscriber information; (3) camp load balancing; and (4) traffic load balancing. The UE capability denotes that a cell is selected according to a frequency band selectable by the UE. This is because a frequency band that can be used by the UE itself may be limited. The subscriber information denotes that the UE can be configured to enable or disable cell selection according to the subscriber information or a service provider's policy. The camp load balancing denotes that, in order to reduce a load resulted from data generated when a plurality of UEs in an idle state are activated in one cell, a cell used by a small number of UEs is selected. The traffic load balancing is for changing a cell in order to reduce a load resulted from data generated in activated UEs. By using the camp load balancing and the traffic load balancing, UEs within the same cell can perform communication by sharing radio resources. In addition, since load balancing is achieved between cells, the radio resources can be effectively used.

Figure 10:
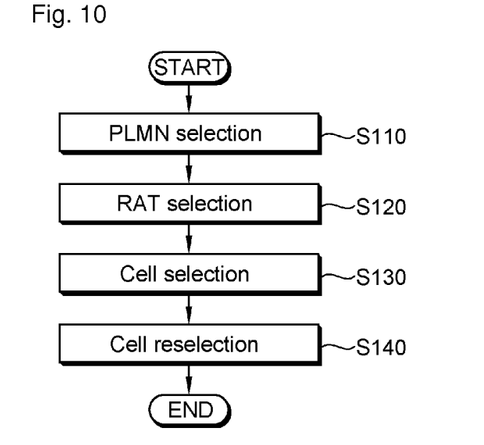
FIG. 10 is a flowchart showing a cell selection procedure performed by a UE in an idle mode.

FIG. 10 is a flowchart showing a cell selection procedure performed by a UE in an idle mode.

Referring to FIG. 10, when power is on, the UE selects an external network such as a public land mobile network (PLMN) through which the UE intends to receive a service (step S110). The UE can select the PLMN according to a priority list of the PLMN. The UE can obtain the list containing one or more PLMNs by using system information provided through a broadcast channel.

The UE selects a radio access technology (RAT) to communicate with the selected PLMN (step S120). The PLMN and the RAT may be selected by a user of the UE, or may be pre-stored in the UE.

The UE performs a cell selection operation (step S130). The UE searches for a cell of the selected PLMN and selects a desired cell for providing an available service. The cell selection operation includes an initial cell selection operation and a stored information cell selection operation. In the initial cell selection operation, the UE scans all RF channels without knowing an RF channel of the system. In the stored information cell selection operation, the UE selects a desired cell by using cell information obtained from a previously measured cell or from control information. If the desired cell cannot be selected in the stored information cell selection operation, the UE performs the initial cell selection operation.

Among cells in which the strength or quality of a signal transmitted from a BS is greater than a specific threshold, the UE selects a cell having a greatest value. The threshold for cell selection denotes a value defined in the system to obtain guaranteed quality of a physical signal when data is transmitted or received. The threshold for cell selection may vary depending on the selected RAT. The UE tunes to a control channel of the selected cell. The UE receives system information periodically transmitted from the BS.

In the cell selection operation, the UE can be registered to the network. The UE registers its information to the network in order to receive a service such as paging from the network. The UE is registered to the network when network information known to the UE is different from network information obtained from the system information, instead of being registered to the network to be accessed whenever the UE performs the cell selection operation.

The UE performs a cell reselection operation by evaluating necessity of cell reselection (step S140). If cell reselection is not necessary, the UE does not perform the cell reselection operation but remains in a current serving cell. If the strength or quality of a signal measured from the serving cell from which a service is currently received is less than the threshold for cell reselection, the UE selects one of neighbor cells providing a better signal characteristic than the serving cell. Examples of the signal characteristic to be measured include reference symbol received power (RSRP), reference symbol received quality (RSRQ), received signal strength indicator (RSSI), etc.

Figure 11:
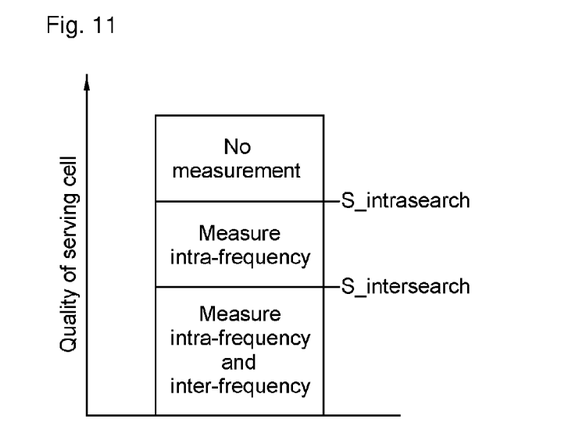
FIG. 11 shows a criterion of cell search that is performed for cell reselection by a UE.

FIG. 11 shows a criterion of cell search that is performed for cell reselection by a UE.

Referring to FIG. 11, the UE periodically measures a signal from a serving cell and determines whether to perform cell reselection. The UE compares the strength or quality of the measured signal from the serving cell with a threshold, and thus restricts a cell search operation for the cell reselection.

Equation 1 shows one criterion of cell search that is performed for cell reselection.

MathFigure 1

$$S_{ServingCell} < S_{intrasearch}, \text{ not perform intra frequency measurements}$$

$$S_{ServingCell} \leq S_{interesearch}, \text{ perform intra frequency measurements} \quad [\text{Math.1}]$$

In Equation 1, $S_{ServingCell}$ denotes a signal characteristic (e.g., RSRP) measured from the serving cell, and $S_{intrasearch}$ denotes a threshold for intra-frequency measurement. The intra-frequency measurement denotes that frequency bands in the same E-UTRAN are measured. In the intra-frequency measurement, a signal characteristic of a neighbor cell using the same frequency band as the serving cell is measured. If the signal characteristic measured from the serving cell is greater than the threshold for intra-frequency measurement, the UE does not perform the intra-frequency measurement. That is, since the signal characteristic of the serving cell is superior to that of the neighbor cell, cell reselection is not necessary. Thus, the UE does not perform the cell search for the cell reselection. Otherwise, if the signal characteristic measured from the serving cell is less than the threshold for intra-frequency measurement, the UE performs the intra-frequency measurement.

Equation 2 shows another criterion of cell selection that is performed for cell reselection.

MathFigure 2

$$S_{ServingCell} < S_{intersearch}, \text{ not perform inter frequency measurements}$$

$$S_{ServingCell} \leq S_{intersearch}, \text{ perform inter frequency measurements} \quad [\text{Math.2}]$$

In Equation 2, $S_{intersearch}$ denotes a threshold for inter-frequency measurement. The inter-frequency measurement denotes that a signal characteristic of a neighbor cell using a frequency band different from a serving cell is measured. The inter-frequency measurement denotes that frequency bands of different E-UTRANs are measured. If the signal characteristic measured from the serving cell is greater than the threshold for inter-frequency measurement, the UE does not perform the inter-frequency measurement. Otherwise, if the signal characteristic measured from the serving cell is less than the threshold for inter-frequency measurement, the UE performs the inter-frequency measurement.

If the signal quality of the serving cell is less than a first threshold for the intra-frequency measurement, only the intra-frequency measurement is performed. Otherwise, if the signal quality of the serving cell is less than a second threshold, the intra-frequency measurement and the inter-frequency measurement are performed. A criterion for performing cell search through signal measurement is referred to as S-criterion.

When a criterion for performing the intra-frequency measurement or the inter-frequency measurement is satisfied, the UE sorts cell-rankings of the serving cell and its neighbor cells. Equation 3 shows a criterion for sorting the cell rankings. This criterion is referred to as R-criterion.

MathFigure 3

$$R_s = Q_{meas,s} + Q\text{hyst}_s$$

$$R_n = Q_{meas,n} - Q\text{offset} \quad [\text{Math.3}]$$

In Equation 3, $R_s$ denotes a cell ranking of the serving cell, $R_n$ denotes a cell ranking of the neighbor cell, $Q_{meas,s}$ denotes an RSRP measurement value of the serving cell, and $Q_{meas,n}$ denotes an RSRP measurement value of the neighbor cell. $Q\text{hyst}_s$ is used to provide a weight factor to the serving cell. Qoffset is used to provide a bias between the serving cell and a cell to be reselected. $Q\text{hyst}_s$ and Qoffset may be provided to the UE by using system information.

The UE performs a cell reselection operation on a cell having a highest ranking among neighbor cells satisfying the condition of $R_n > R_s$ during a reselection time period Treselection. The reselection time period is reported by the BS to the UE by using the system information. The reselection time period is used to impose a limitation in that a condition of cell selection has to be satisfied for a specific time period or more. A cell change may denote an RAT change. Examples of the type of RAT includes a global system for mobile communications (GSM)/general packet radio service (GPRS), a UMTS, an E-UMTS, etc. Inter-RAT measurement denotes that an RAT of the neighbor cell is measured for the RAT change.

The UE may request the network to provide a service, or may wait in an idle mode in order to receive the service from the network. The UE in the idle mode repeats the cell reselection operation in which a cell having a superior signal characteristic is reselected by measuring signals of neighbor cells of a cell currently receiving a service.

In a method for performing cell search for cell selection on the basis of signal measurement, power consumption of the UE can be reduced. However, the method based on signal measurement is dependent on the UE, and thus does not consider necessary system factors such as camp load or traffic load of the system. The BS needs to control the cell reselection of the UE if required.

Figure 12:
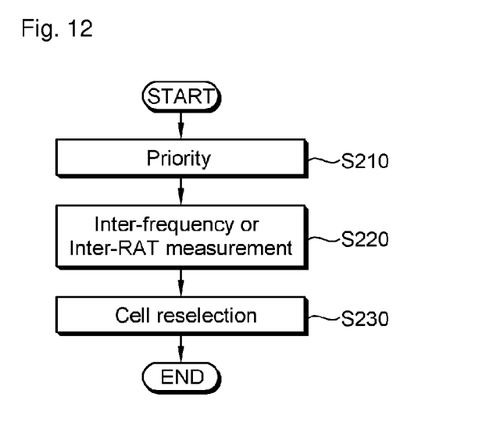
FIG. 12 is a flowchart showing a cell reselection procedure performed by a UE according to an embodiment of the present invention.

FIG. 12 is a flowchart showing a cell reselection procedure performed by a UE according to an embodiment of the present invention.

Referring to FIG. 12, a BS can control the cell reselection procedure of the UE by providing a priority to the UE. Alternatively, the UE can perform the cell reselection procedure by using a predetermined priority. The priority may be provided to determine a priority between a serving cell and a neighbor cell, each of which uses a different frequency band in the cell reselection. The priority may be provided to determine a priority between different E-UTRAN frequencies or different inter-RAT frequencies. The cell reselection procedure performed by the UE differs according to whether the priority is provided or not. When the priority is provided, the UE performs inter-frequency measurement or inter-RAT measurement on a cell having a highest priority irrespective of whether the S-criterion is satisfied or not.

The UE evaluates the priority (step S210). The priority may be provided from the serving cell. The priority may be determined by the UE by using information pre-stored in the UE. The priority is 1-bit information that can indicate whether the priority is applied. Alternatively, the priority may indicate whether the priority is applied for each of the inter-frequency measurement or inter-RAT measurement. Alternatively, the priority may be provided to the UE in a form of a probability value in consideration of a camp load or traffic load of the system. For example, if a system load of a currently used E-UTRAN is greater than that of another E-UTRAN, a decreased priority may be provided to the UE, and otherwise, an increased priority may be provided to the UE. For the system load, the followings can be taken into consideration, that is, the number of UEs in a cell receiving a service from the BS, a traffic amount of a service provided in each cell by the BS, a required quality of service (QoS), a QoS provided by the BS, a QoS of a subscriber, etc.

The priority can be provided to the UE by using system information. Alternatively, the priority can be provided to the UE by using an RRC message. Examples of the RRC message include the system information, a paging message, a radio bearer setup message, a radio bearer reconfiguration message, an RRC connection request message, an RRC connection setup message, an RRC connection release message, etc.

The priority may be provided to the UE by using dedicated signaling. The UE ignores another priority provided using the system information other than the priority provided using the dedicated signaling. When the UE moves out of a PLMN assigned with the priority, or when the UE enters an RRC connected state or until a valid time of the priority is terminated, the UE performs the cell reselection procedure by using the priority provided using the dedicated signaling.

When the priority is provided, the UE performs the inter-frequency measurement or inter-RAT measurement (step S220). The UE can perform the inter-frequency measurement or inter-RAT measurement according to the priority. (1) The UE performs the inter-frequency measurement or inter-RAT measurement on an E-UTRAN having a higher priority than the priority of the currently used E-UTRAN. (2) The UE performs the inter-frequency measurement or inter-RAT measurement on an E-UTRAN having a lower priority than the currently used E-UTRAN by using the criterion of Equation 2 above. In this case, $S_{intersearch}$ denotes a threshold for the inter-frequency measurement or inter-RAT measurement. That is, for a neighbor cell having a high priority, the inter-frequency measurement or inter-RAT measurement is performed irrespective of the S-criterion, and for a neighbor cell having a low priority, the inter-frequency measurement or inter-RAT measurement is performed on only a neighbor cell satisfying the S-criterion.

The UE performs a cell reselection operation according to the priority as follows (step S230).

(1) Among cells of an RAT or E-UTRAN having a higher priority than the currently used E-UTRAN, a cell having a signal characteristic greater than a first priority threshold is reselected. Among cells having a high priority and having a signal characteristic greater than the first priority threshold, the UE reselects a cell having a best signal characteristic. The first priority threshold is a criterion for reselecting cells having a high priority. The first priority threshold may vary according to the E-UTRAN or RAT.

(2) For E-UTRANs having the same priority, the UE may perform the cell reselection operation by sorting cell rankings according to Equation 3 above. Cell reselection of E-UTRANs having the same priority can be regarded as cell reselection using intra-frequency measurement for the same E-UTRAN.

(3) Among cells of the currently used E-UTRAN or E-UTRAN/RAT having a high priority, if there is no cell having a signal characteristic greater than the first priority threshold and if a signal characteristic of a serving cell is less than a value defined to perform cell reselection, the UE performs cell reselection on the E-UTRAN or RAT having a lower priority. Among cells of the E-UTRAN or RAT having a low priority, the UE performs cell reselection on a cell having a signal characteristic greater than a second priority threshold. The second priority threshold is a criterion for reselecting cells having a low priority. The second priority threshold may vary according to the E-UTRAN or the RAT.

Figure 13:
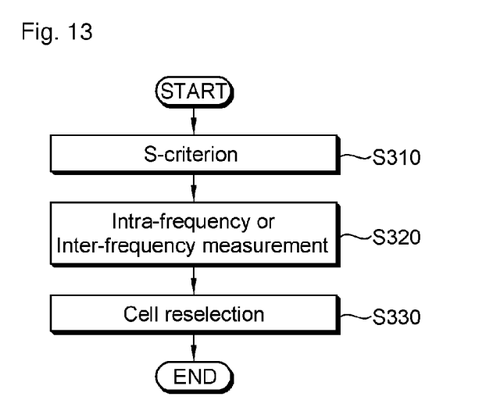
FIG. 13 is a flowchart showing a cell reselection procedure performed by a UE according to another embodiment of the present invention.

FIG. 13 is a flowchart showing a cell reselection procedure performed by a UE according to another embodiment of the present invention. This is a case where a priority is not provided to the UE.

Referring to FIG. 13, when the priority is not provided to the UE, then UE performs cell reselection based on signal measurement, that is, based on the S-criterion (step S310).

The UE measures signals from a serving cell and then performs intra-frequency measurement or inter-frequency measurement according to Equation 1 or Equation 2 above (step S320).

If a criterion for performing the intra-frequency measurement or inter-frequency measurement is satisfied, the UE sorts rankings of a serving cell and its neighbor cells. A cell having a highest ranking is reselected from neighbor cells satisfying the condition of $R_n > R_s$ (step S330).

The UE evaluates whether the priority is provided for cell reselection. If the priority is provided, as shown in FIG. 12, the UE performs the cell reselection procedure based on the priority. Otherwise, if the priority is not provided, as shown in FIG. 13, the UE performs the cell reselection procedure based on the S-criterion.

If the priority is not provided to the UE, the cell reselection procedure is performed according to the channel quality of the UE. There is a need to control the cell reselection of the UE by considering a system load even when the priority is not provided.

Figure 14:
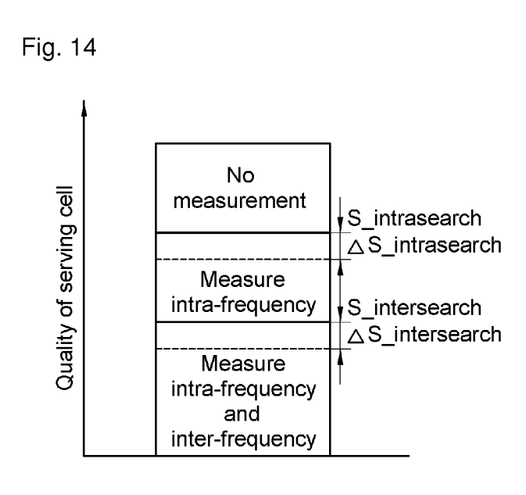
FIG. 14 shows a criterion of cell search that is performed for cell reselection by a UE according to an embodiment of the present invention.

FIG. 14 shows a criterion of cell search that is performed for cell reselection by a UE according to an embodiment of the present invention.

Referring to FIG. 14, a BS provides the UE with a cell reselection indicator to control cell reselection of the UE. The cell reselection indicator may indicate a threshold of the S-criterion used in cell reselection, or a parameter for adjusting cell rankings of the R-criterion, or an increment/decrement value of the parameter. The cell reselection indicator can be broadcast to all UEs within a cell by using system information. Alternatively, the cell reselection indicator can be multicast to a specific UE group or can be unicast to one UE.

Equation 4 shows an intra-frequency measurement criterion added with a parameter for adjusting a threshold of the S-criterion.

MathFigure 4

$$S_{ServingCell} > S_{intrasearch} + \Delta S_{intrasearch}, \text{ not perform intra frequency measurements}$$

$$S_{ServingCell} \leq S_{intrasearch} + \Delta S_{intrasearch}, \text{ perform intra-frequency measurements} \quad [\text{Math.4}]$$

In Equation 4, $\Delta S_{intrasearch}$ denotes a $1^{st}$ parameter of the S-criterion for adjusting a threshold of intra-frequency measurement. The increase in the $1^{st}$ parameter value results in the increase in the number of UEs performing intra-frequency measurement. The decrease in the $1^{st}$ parameter value results in the decrease in the number of UEs performing intra-frequency measurement. That is, by adjusting the $1^{st}$ parameter, the number of UEs performing intra-frequency measurement can be adjusted.

Equation 5 shows an inter-frequency measurement criterion added with a parameter for adjusting a threshold of the S-criterion.

MathFigure 5

$$S_{ServingCell} > S_{intersearch} + \Delta S_{intersearch}, \text{ not perform inter-frequency measurements}$$

$$S_{ServingCell} \leq S_{intersearch} + S_{intersearch}, \text{ perform inter-frequency measurements} \quad [\text{Math.5}]$$

In Equation 5, $\Delta S_{intersearch}$ denotes a $2^{nd}$ parameter of the S-criterion for adjusting a threshold of inter-frequency measurement. The increase in the $2^{nd}$ parameter value results in the increase in the number of UEs performing inter-frequency measurement. The decrease in the $2^{nd}$ parameter value results in the decrease in the number of UEs performing inter-frequency measurement. That is, by adjusting the $2^{nd}$ parameter, the number of UEs performing inter-frequency measurement can be adjusted.

Equation 6 shows a criterion for sorting cell rankings added with a parameter for adjusting cell rankings of the R-criterion.

MathFigure 6

$$R_s = Q_{meas,s} + Q\text{hyst}_s$$

$$R_{n,intra} = Q_{meas,n} - Q\text{offset} - \Delta Q\text{offset}_{n,intra}$$

$$R_{n,inter} = Q_{meas,n} - Q\text{offset} - \Delta Q\text{offset}_{n,inter} \quad [\text{Math.6}]$$

In Equation 6, $R_{n,intra}$ denotes a cell ranking of a neighbor cell in intra-frequency measurement. $R_{n,inter}$ denotes a cell ranking of a neighbor cell in inter-frequency measurement. $\Delta Q\text{offset}_{n,intra}$ denotes a $3^{rd}$ parameter for adjusting the cell ranking of neighbor cell in intra-frequency measurement. $\Delta Q\text{offset}_{n,inter}$ denotes a $4^{th}$ parameter for adjusting the cell ranking of neighbor cell in inter-frequency measurement. In intra-frequency measurement, the increase in the $3^{rd}$ parameter value results in the decrease in a probability of intra-cell reselection. In addition, the decrease in the $3^{rd}$ parameter value results in the increase in a probability of intra-cell reselection to the neighbor cell. In inter-frequency measurement, the increase in the $4^{th}$ parameter value results in the decrease in a probability of inter-cell reselection. In addition, the decrease in the $4^{th}$ parameter value results in the increase in a probability of inter-cell reselection to the neighbor cell.

It will be assumed that the system load is high and thus there is no need to control cell reselection performed by UEs. In order to reduce the system load, the BS allows the UEs to perform cell reselection more frequently. The BS increases the $1^{st}$ parameter or the $2^{nd}$ parameter, thereby increasing the number of UEs performing intra-frequency measurement or inter-frequency measurement. Further, the BS decreases the $3^{rd}$ parameter or the $4^{th}$ parameter, thereby increasing a probability that a UE performs cell reselection to a neighbor cell. The BS can reduce the system load by selectively adjusting a parameter value among the $1^{st}$ to $4^{th}$ parameters. System load balancing can be controlled between BSs by sharing the S-criterion or the R-criterion.

By using the $3^{rd}$ parameter and the $4^{th}$ parameter, the BS can determine which operation will be first performed between intra-cell reselection and inter-cell reselection. For example, if the $4^{th}$ parameter value is relatively more decreased than the $3^{rd}$ parameter, a probability of performing inter-cell reselection increases. Thus, intra-cell reselection can be performed prior to inter-cell reselection. The $3^{rd}$ parameter or the $4^{th}$ parameter can be adjusted differently according to a cell or a layer. The $3^{rd}$ parameter or the $4^{th}$ parameter can have the same value in the same layer irrespective of the cell.

The cell reselection indicator may be determined in consideration of an overhead of system information. If the cell reselection indicator indicates actual values of the $1^{st}$ to $4^{th}$ parameters, the overhead of system information may be great. The cell reselection indicator can indicate increment/decrement values of the $1^{st}$ to $4^{th}$ parameters. Alternatively, the cell reselection indicator can indicate whether the $1^{st}$ to $4^{th}$ parameters are increased or decreased. For example, if it is predetermined that the $1^{st}$ to $4^{th}$ parameters are increased or decreased by a specific magnitude, the cell reselection indicator can indicate whether the $1^{st}$ to $4^{th}$ parameters are increased or decreased using one bit. The cell reselection indicator can selectively indicate an actual value or an increment/decrement value of any one of the $1^{st}$ to $4^{th}$ parameters.

Meanwhile, when the system load is considered, inter-cell reselection may be advantageous over intra-cell reselection in terms of effectiveness control. The $1^{st}$ and $3^{rd}$ parameters in association with the intra-frequency measurement can remain as fixed values, and only $2^{nd}$ and $4^{th}$ parameters in association with the inter-frequency measurement can be adjusted as cell reselection indicators. The cell reselection indicator can indicate an increment/decrement value of each of the $2^{nd}$ and $4^{th}$ parameters or can indicate whether the parameters are increased or decreased. The $2^{nd}$ and $4^{th}$ parameters for system load balancing may be increased or decreased by a specific magnitude predetermined between the BS and the UE. The cell reselection indicator can indicate whether the $2^{nd}$ and $4^{th}$ parameters are increased or decreased at once using one bit. For example, if the cell reselection indicator is '1', it indicates the increase in a cell load, and if the cell reselection indicator is '0', it indicates the decrease in the cell load. If the cell reselection indicator is not transmitted, it indicates no change in the cell load. When the cell reselection indicator of 1 is transmitted, the UE performs inter-cell reselection by increasing the $2^{nd}$ parameter to a predetermined value and by decreasing the $4^{th}$ parameter to a predetermined value. When the cell reselection indicator of 0 is transmitted, the UE performs inter-cell reselection by decreasing the $2^{nd}$ parameter to a predetermined value and by increasing the $4^{th}$ parameter to a predetermined value.

Every function as described above can be performed by a processor such as a micro-processor based on software coded to perform such function, a program code, etc., a controller, a micro-controller, an ASIC (Application Specific Integrated Circuit), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

The invention claimed is:

1. A method of performing a cell reselection procedure in a wireless communication system, the method performed by a user equipment (UE) and comprising:
receiving, from a network, priorities of a serving cell and neighbor cells, wherein a frequency band used by the serving cell is different from a frequency band used by one of the neighbor cells, wherein the priorities are received via system information from a base station;
performing inter-frequency measurement on a neighbor cell which has a higher priority than the serving cell irrespective of signal measurement of the serving cell;
performing the inter-frequency measurement on a neighbor cell which has an equal or lower priority than the serving cell, when a signal characteristic of the serving cell is less than a threshold; and
performing cell reselection according to the priorities.

2. The method of claim 1, wherein the inter-frequency measurement measures frequencies of different evolved-UMTS terrestrial radio access networks (E-UTRANs) or different radio access technologies (RATs).

3. The method of claim 1, wherein, among the neighbor cells, cell reselection is performed on a neighbor cell having a higher priority than the serving cell and having a signal characteristic greater than a first priority threshold which is used as a criterion for reselecting cells having a high priority.

4. The method of claim 1, wherein, among the neighbor cells, cell reselection is performed on a neighbor cell having a lower priority than the serving cell and having a signal characteristic greater than a second priority threshold which is used as a criterion for reselecting cells having a low priority.

5. The method of claim 1, wherein, among the neighbor cells, the cell reselection is performed on a neighbor cell having the same priority with the serving cell and having a high cell ranking based on a signal characteristic.

6. The method of claim 1, wherein the priorities are received via at least one of the system information and dedicated signaling, wherein priorities included in the system information are disregarded by the UE when the dedicated signaling indicating the priorities is received by the UE.

7. The method of claim 1, wherein the inter-frequency measurement on the neighbor cell which has a higher priority than the serving cell is performed irrespective of whether the signal characteristic of the serving cell is less than the threshold or not.

8. A user equipment (UE) performing a cell reselection procedure in a wireless communication system comprising:
a processor configured for:
receiving, from a network, priorities of a serving cell and neighbor cells, wherein a frequency band used by the serving cell is different from a frequency band used by one of the neighbor cells, wherein the priorities are received via system information from a base station;
performing inter-frequency measurement on a neighbor cell which has a higher priority than the serving cell irrespective of signal measurement of the serving cell;
performing the inter-frequency measurement on a neighbor cell which has an equal or lower priority than the serving cell, when a signal characteristic of the serving cell is less than a threshold; and
performing cell reselection according to the priorities.

* * * * *